United States Patent
Kalish

(10) Patent No.: US 10,924,815 B2
(45) Date of Patent: Feb. 16, 2021

(54) SYSTEM AND METHOD FOR GENERATING AND UPDATING VIDEO NEWS EDITION

(71) Applicant: IDOMOO LTD, Hod Hasharon (IL)

(72) Inventor: Danny Kalish, Raanana (IL)

(73) Assignee: IDOMOO LTD, Hod Hasharon (IL)

( * ) Notice: Subject to any disclaimer, the term of this patent is extended or adjusted under 35 U.S.C. 154(b) by 188 days.

(21) Appl. No.: 14/985,615

(22) Filed: Dec. 31, 2015

(65) Prior Publication Data

US 2017/0195750 A1    Jul. 6, 2017

(51) Int. Cl.
| | |
|---|---|
| H04N 5/445 | (2011.01) |
| H04N 21/81 | (2011.01) |
| H04N 21/2668 | (2011.01) |
| H04N 21/258 | (2011.01) |
| H04N 21/854 | (2011.01) |
| H04N 21/262 | (2011.01) |

(52) U.S. Cl.
CPC ... *H04N 21/8126* (2013.01); *H04N 21/25891* (2013.01); *H04N 21/2668* (2013.01); *H04N 21/26258* (2013.01); *H04N 21/854* (2013.01)

(58) Field of Classification Search
CPC ........ G06F 17/30371; H04N 21/25891; H04N 21/2668; H04N 21/854; H04N 21/8126
See application file for complete search history.

(56) References Cited

U.S. PATENT DOCUMENTS

| | | | | |
|---|---|---|---|---|
| 5,764,306 | A * | 6/1998 | Steffano | G11B 27/034 348/552 |
| 6,208,386 | B1 * | 3/2001 | Wilf | H04N 5/2628 348/578 |
| 6,952,221 | B1 * | 10/2005 | Holtz | G11B 27/034 715/719 |
| 7,334,249 | B1 * | 2/2008 | Byers | H04N 7/165 348/E7.063 |
| 9,171,084 | B1 * | 10/2015 | Skatell | G06F 7/24 |
| 9,360,983 | B1 * | 6/2016 | Hundemer | G06F 40/166 |
| 9,641,898 | B2 * | 5/2017 | Bloch | H04N 21/47217 |
| 2002/0054244 | A1 * | 5/2002 | Holtz | G06F 3/0481 348/722 |
| 2002/0108115 | A1 * | 8/2002 | Palmer | H04N 7/165 725/50 |
| 2003/0156506 | A1 * | 8/2003 | Kanada | G11B 20/10 369/30.29 |
| 2005/0182675 | A1 * | 8/2005 | Huettner | G06Q 30/0258 705/14.56 |

(Continued)

*Primary Examiner* — Annan Q Shang
(74) *Attorney, Agent, or Firm* — Browdy and Neimark, P.L.L.C.

(57) ABSTRACT

A method for generating and updating video news edition. The method includes generating a basic news edition by organizing news items according to a customizable priority and creating a priority queue, wherein for each news item dynamic news objects are defined, receiving a user request for an updated news video edition for a schedule (specific date and time), receiving news objects related to the requested news edition based on user profile data and real-time news updates, integrating the new objects into the last updated news edition provided by a t news provider, and updating objects such as images, audio tracks, text parts and/or video elements in the news edition based on the latest new information available and start streaming the updated news edition video to the user.

11 Claims, 10 Drawing Sheets

(56) References Cited

U.S. PATENT DOCUMENTS

| | | | |
|---|---|---|---|
| 2005/0188053 A1* | 8/2005 | Shimamura | G06Q 10/00 709/217 |
| 2006/0235885 A1* | 10/2006 | Steele | G06F 17/30867 |
| 2007/0124416 A1* | 5/2007 | Casey | H04L 67/26 709/217 |
| 2007/0124781 A1* | 5/2007 | Casey | H04N 21/2665 725/94 |
| 2007/0143493 A1* | 6/2007 | Mullig | H04N 21/23435 709/232 |
| 2007/0213078 A1* | 9/2007 | Shaheen | H04L 65/1016 455/466 |
| 2007/0250848 A1* | 10/2007 | Gorti, Sr. | H04N 21/6175 725/14 |
| 2009/0033482 A1* | 2/2009 | Hayter | G06F 19/00 340/501 |
| 2009/0193457 A1* | 7/2009 | Conn | H04N 21/812 725/34 |
| 2010/0050083 A1* | 2/2010 | Axen | H04N 5/85 715/726 |
| 2010/0070448 A1* | 3/2010 | Omoigui | H01L 27/14647 706/47 |
| 2011/0258154 A1* | 10/2011 | Koppula | G06F 17/30899 706/46 |
| 2011/0263295 A1* | 10/2011 | Kim | G06F 8/38 455/558 |
| 2011/0302617 A1* | 12/2011 | Greenfield | H04N 7/17336 725/96 |
| 2012/0173485 A1* | 7/2012 | Kothule | G06F 16/954 707/634 |
| 2012/0179449 A1* | 7/2012 | Raskino | G06F 17/30719 704/2 |
| 2012/0290637 A1* | 11/2012 | Perantatos | G06Q 10/10 709/203 |
| 2013/0018949 A1* | 1/2013 | Pradeep | G06Q 50/01 709/204 |
| 2013/0063561 A1* | 3/2013 | Stephan | H04N 13/302 348/46 |
| 2013/0115981 A1* | 5/2013 | Toksvig | H04W 4/12 455/466 |
| 2013/0141530 A1* | 6/2013 | Zavesky | H04N 21/21805 348/43 |
| 2013/0166673 A1* | 6/2013 | Elango | G06F 16/9535 709/217 |
| 2014/0052542 A1* | 2/2014 | Zhang | G06Q 30/0269 705/14.66 |
| 2014/0067828 A1* | 3/2014 | Archibong | G06F 17/30277 707/748 |
| 2014/0108340 A1* | 4/2014 | Osher | H04N 21/4524 707/623 |
| 2014/0129942 A1* | 5/2014 | Rathod | H04N 21/44222 715/720 |
| 2014/0136554 A1* | 5/2014 | Moradi | G06F 16/435 707/754 |
| 2014/0173648 A1* | 6/2014 | Ball | H04N 21/8133 725/25 |
| 2014/0195605 A1* | 7/2014 | Kallayil | G06Q 50/01 709/204 |
| 2014/0222800 A1* | 8/2014 | Vadrevu | G06F 17/30867 707/724 |
| 2014/0310062 A1* | 10/2014 | Klein | G06Q 30/0203 705/7.32 |
| 2014/0325551 A1* | 10/2014 | McMillan | H04N 21/6175 725/20 |
| 2015/0095460 A1* | 4/2015 | Berger | H04L 67/06 709/219 |
| 2015/0100984 A1* | 4/2015 | Hsiung | H04N 21/4825 725/39 |
| 2015/0189381 A1* | 7/2015 | Wellen | H04N 21/4334 725/61 |
| 2015/0249847 A1* | 9/2015 | Khare | H04N 21/23614 725/34 |
| 2015/0277686 A1* | 10/2015 | LaForge | G06F 3/0484 715/723 |
| 2015/0294634 A1* | 10/2015 | Jung | H04L 51/32 345/212 |
| 2015/0326951 A1* | 11/2015 | Strein | H04N 21/812 725/32 |
| 2016/0006645 A1* | 1/2016 | Rave | H04L 12/2854 709/203 |
| 2016/0241617 A1* | 8/2016 | Jelley | G06F 17/30017 |
| 2016/0328108 A1* | 11/2016 | Li | G06F 3/0485 |
| 2017/0024471 A1* | 1/2017 | Liu | H04N 21/278 |
| 2017/0064413 A1* | 3/2017 | Nayak | H04N 21/8133 |
| 2017/0098266 A1* | 4/2017 | Taylor | G06Q 30/0625 |
| 2019/0156862 A1* | 5/2019 | Axen | G11B 27/031 |

\* cited by examiner

| Audio Generation Module | 500 |

> The module is Launched by the Video news release update module  510

> This module repeatedly polls for input data created by a single or multiple executions of the audible material preparation module. Input data is processed according to its chronological and programmed order.  520

> Audio streams are refined, concatenated in proper gaps and ordering according to rules defined during the Audible materials preparation module  530

> The Audio streams are then processed and mixed together to create single, unified audio stream to be used as the video's audio stream.  540

> The audio stream is piped to the video encoding module  550

Figure 5

| Video Rendering Module | 600 |

Launched by the Video news release update module  610

This module repeatedly polls for input data created by a single or multiple executions of the video material preparation module. Input data is processed according to its chorological and programmed order.  620 incorporating visual materials into a set of video templates as determined during the Visual and Audible materials preparation module.  630

The module's product are rendered video frames . Each rendered Video frame is piped to the video encoding modules according to its chronological order video in the video  640

Figure 6

SYSTEM AND METHOD FOR GENERATING AND UPDATING VIDEO NEWS EDITION

FIELD OF THE INVENTION

The present invention relates generally to generation of context-based media. More particularly, the present invention relates to generating and updating video news editions.

SUMMARY OF THE INVENTION

Additional and/or other aspects and/or advantages of the present invention are set forth in the detailed description which follows. Further aspects may be inferable from the detailed description and/or by practice of the present invention.

The present invention provides a method for generating and updating a video news edition. The method comprising the steps of: generating a basic news edition by organizing news items according to a customizable priority and creating a priority queue, wherein for each news item dynamic news objects are defined; receiving a user request for an updated news video edition for a schedule (specific date and time); receiving news objects related to the requested news edition based on user profile data and real-time news updates, integrating the new objects into the last updated video news edition provided by a news provider; updating objects such as images, audio tracks, text parts and/or video elements in the video news edition based on the latest new information available and start streaming the updated news edition video to the user.

According to some embodiments of the present invention at least generating, receiving, or integrating are performed by at least one processor.

According to some embodiments of the present invention, the method further comprises the steps of: continuously receiving news objects related to the identified news edition based on user profile data and real-time news updates and integrating the new objects into the last updated video news edition while streaming the news edition.

According to some embodiments of the present invention, the method further comprises the step of deleting old items previously watched by the user in the previous edition version.

According to some embodiments of the present invention the method further comprises the step of filtering data based on user preferences or restriction.

According to some embodiments of the present invention, the method further comprises the step of selecting of the news items based on user profile.

The present invention provides a system for generating and updating video news edition, comprising: a news edition creation module for generating basic edition news editions, each edition being generated by organizing news items according to a customizable prioritization and creating a priority queue, wherein for each of said news items dynamic news objects are defined, a video news updating module for receiving a user request for an updated video news edition video for a specific schedule (date and time), receiving news objects related to the requested news edition based on user profile data and real-time news updates, and updating the latest news edition by integrating the new objects into the last updated video news edition provided by a news provider, updating objects of image, audio, text and/or video elements based on the real-time news updates available and start streaming the updated news edition video to the user.

According to some embodiments of the present invention, the video news updating module is further configured for continuously receiving news objects related to the identified news edition based on user profile data and real-time news updates, integrating the new objects into the last updated news edition while streaming the news edition video.

According to some embodiments of the present invention, the video news updating module is further configured for deleting old items previously watched by the user in the previous news edition version. According to some embodiments of the present invention, the video news updating module is further configured for filtering data based on user preferences or restriction.

According to some embodiments of the present invention, the video news updating module is further configured for selecting the news items based on a user profile.

BRIEF DESCRIPTION OF THE DRAWINGS

The present invention will be more readily understood from the detailed description of embodiments thereof made in conjunction with the accompanying drawings of which:

FIG. 5 is a flowchart diagram of an audio generation module, according to some embodiments of the invention;

FIG. 6 is a flowchart diagram of a video rendering module, according to some embodiments of the invention;

DETAILED DESCRIPTION OF SOME EMBODIMENTS OF THE INVENTION

Figure 1:
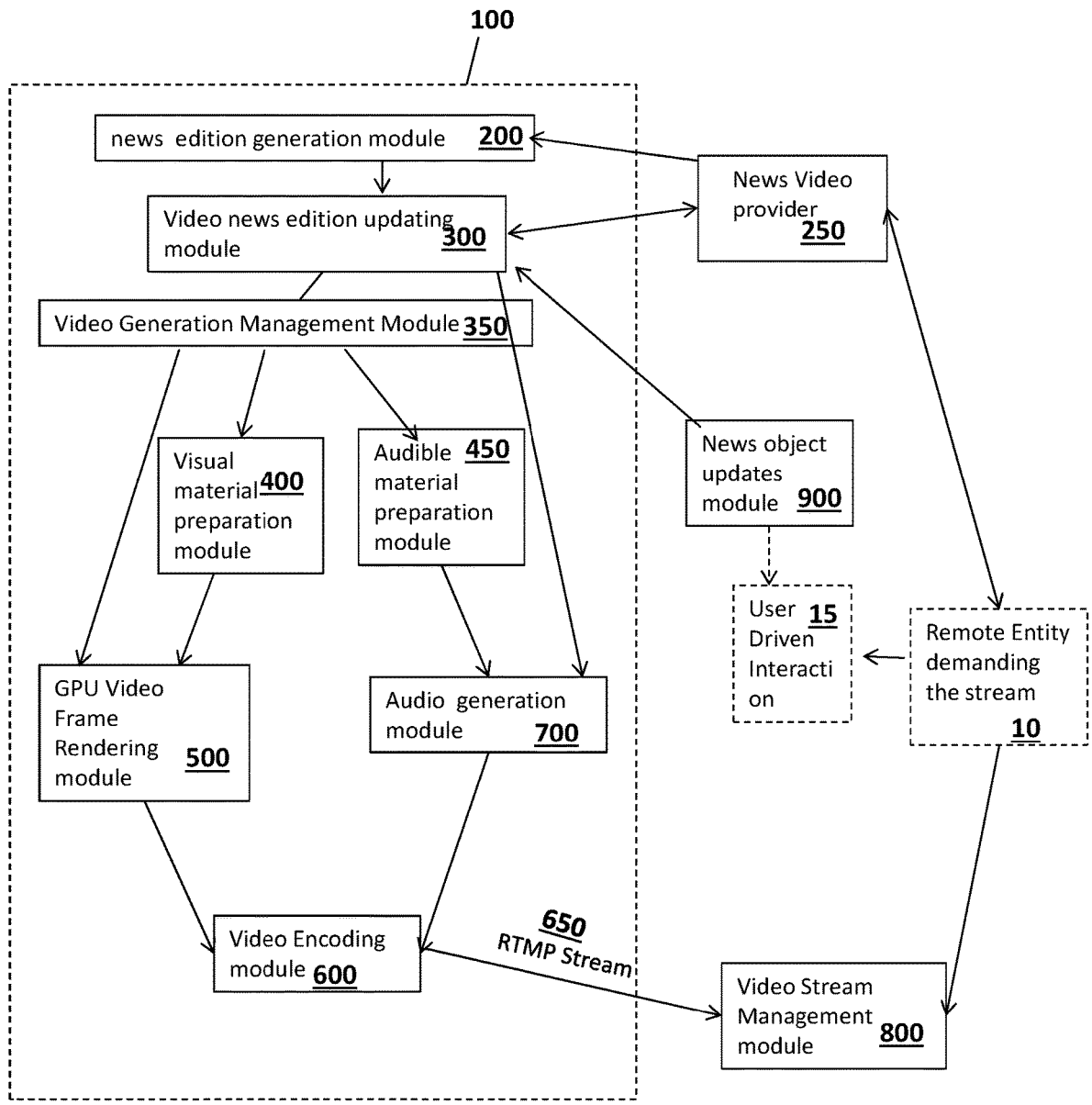
FIG. 1 is a block diagram of system for news generation, according to some embodiments of the invention.

It is to be understood that the invention is not limited to the details of construction or to the arrangement of the components set forth in the following description or as illustrated in the drawings. Embodiments of the present invention may also be practiced or carried out in various ways that will be obvious to a skilled practitioner. Also, it is to be understood that the phraseology and terminology employed herein are for the purpose of description and should not be regarded as limiting.

FIG. 1 is a block diagram of a system 100 for generation and updating of video news editions, according to some embodiments of the invention.

According to some embodiments of the invention, the system 100 uses and optionally also includes at least one processor unit executing different internal modules of the system 100 in communication with different user external modules, which can be implemented on personal processing devices such as a computer, a laptop or smart phones, or on external servers. The system 100 communicates with or includes one or more news update providers such as a news provider Application Programming Interface (API) 250 for receiving a request from a remote entity 10 (such as a computer terminal), by the system server 10 at the video generation management module 350. The request is conveyed to the video news edition update module 300, which initiates and manages a video on-the-fly process for updating a news video edition, the news video edition being based on a priority edition video that is generated by a news edition creation module 200. Throughout the video news edition generation and streaming, the news object updates module 900 polls objects' updates from the news providers such as news provider 250 at any network server which stores the relevant news content website to the Video news edition update module 300. Once the video generating process is initiated, the visual and audible preparation modules (400, 450) are invoked for preparing the audio material, based on the objects updates received from the news object update module 900. The audio generation module 700 and the GPU video frame rendering module 500 poll the media data, which include the audio and visual data from the audio material preparations module (450) and the visual preparations module 400. The received media data (combined audio and visual content) is ready for creating an audio stream and video frames to be conveyed to an encoding module 600. The encoding module 600 is configured for creating an RTMP stream 650 based on generated video frames and an audio sequence/stream, the stream is conveyed to the interactive video stream management module 800.

Figure 2A:
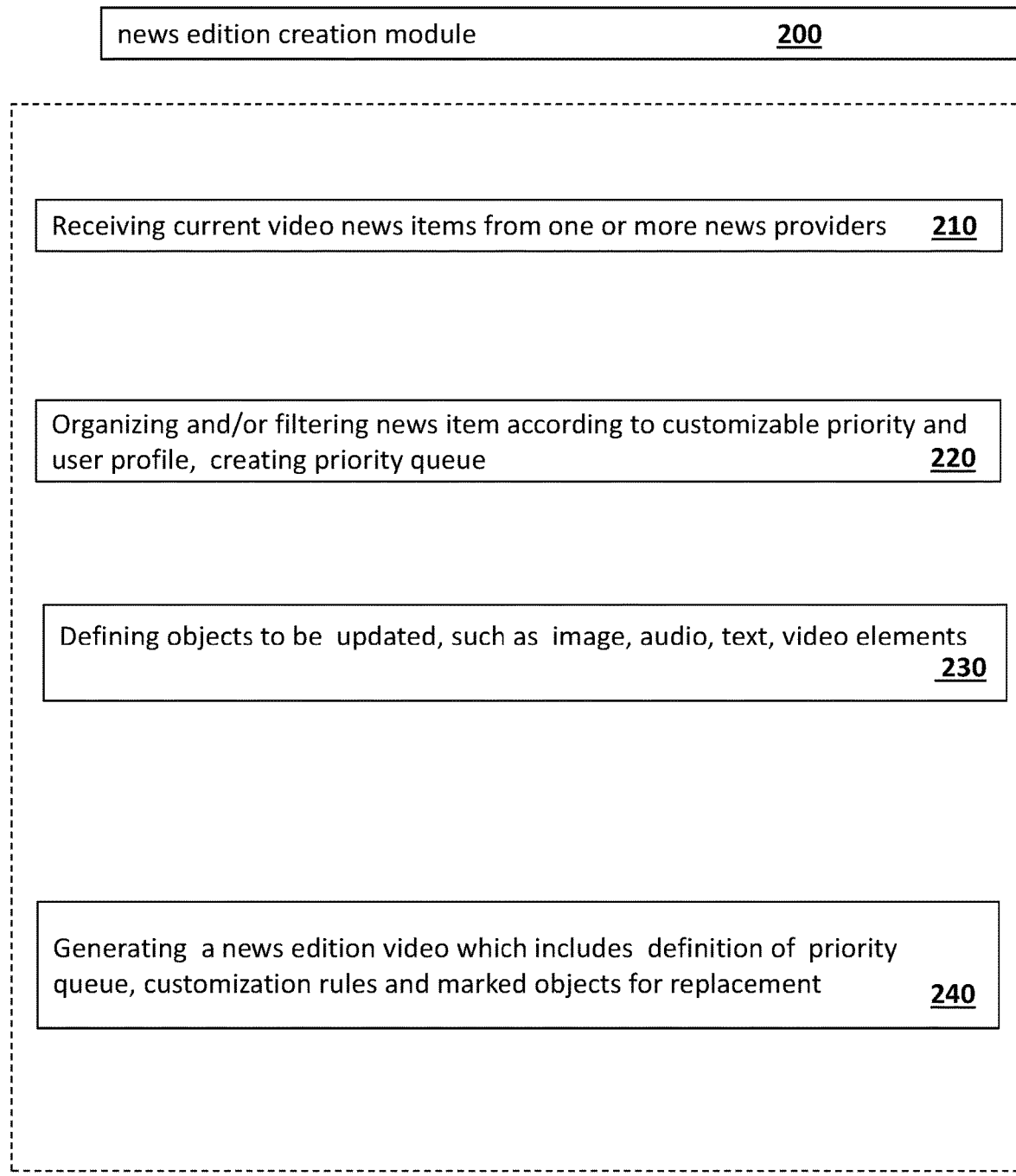
FIG. 2A is a flowchart diagram of a news edition creation module, according to some embodiments of the invention.
Figure 2B:
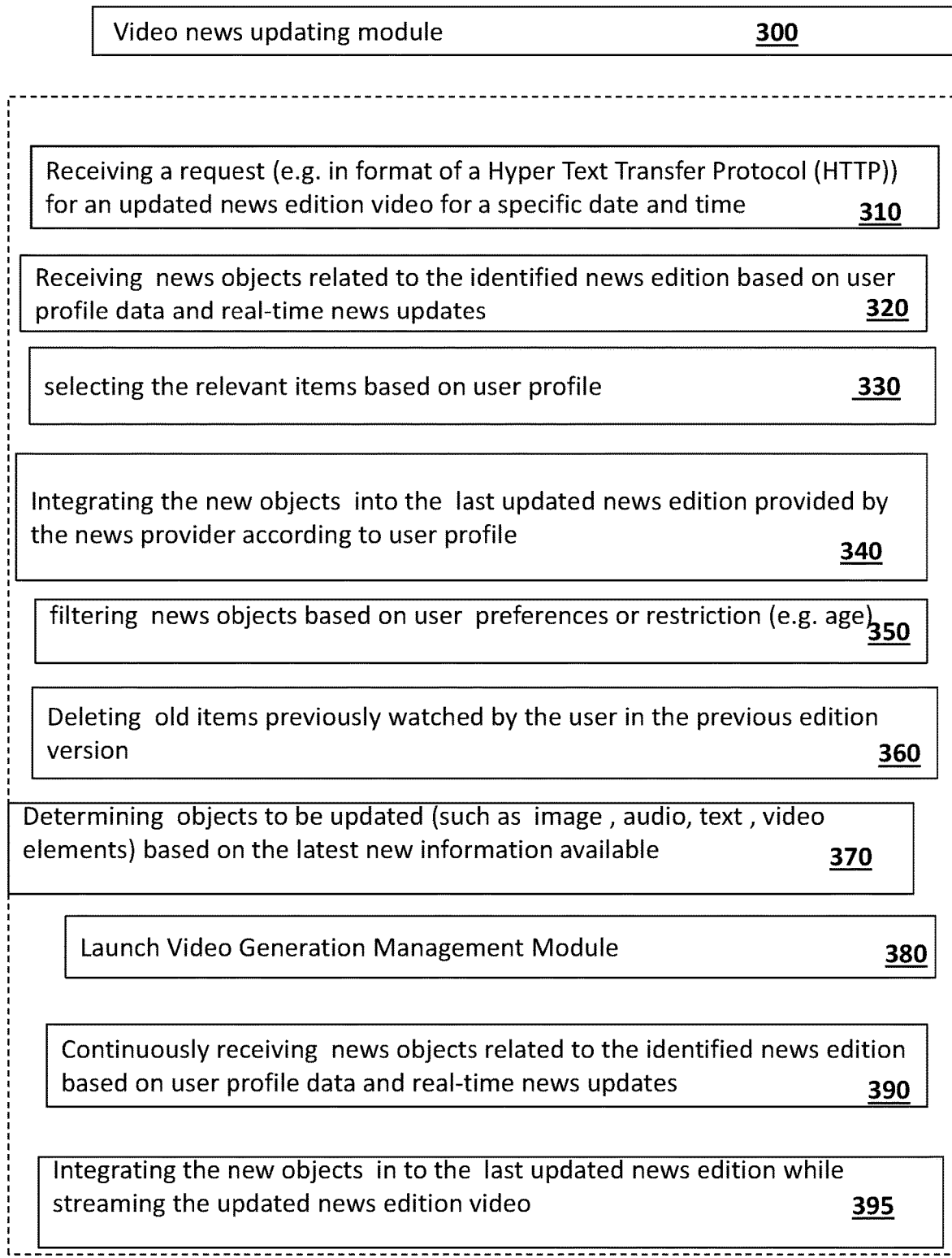
FIG. 2B is a flowchart diagram of a video news updating module, according to some embodiments of the invention.

FIG. 2 is a flowchart diagram of a news edition creation module 200, according to some embodiments of the invention. The news edition creation module implements at least some of the following steps:

Receiving current updated video news items from the news provider (step 210), organizing news items according to customized priority and creating priority queue (step 220), defining objects to be update in each news item, such as: image, audio, text or video elements (step 230) and generating news edition which includes series of news items, originating news item videos according to priority, where each video includes currently updated objects, such as images, texts, audio recordings, etc. (Step 240).

FIG. 2A is a flowchart diagram of a Video news update module 300, according to some embodiments of the invention.

The Video news update module implements at least some of the following steps: receiving for example, a Hyper Text Transfer Protocol (HTTP) request for a news edition video which is updated for a specific schedule, i.e., to a specific date and time (hour) for a specific user (310), receiving updated news objects related to the identified news edition based on user profile data and real-time news updates (320), selecting of the relevant items, based on user profile (330), integrating the updated new objects into the last updated news edition provided by the news provider according to the user profile (340), filtering data based on user preferences or restriction (e.g., age, geographic location and the like) (350), deleting old items previously watched by the user in the previous edition version (360), updating objects of image, audio, text, video elements based on the latest news information available (370) and starting to stream the news edition video to the client (380).

According to some embodiments, the process further includes continuously receiving news objects related to the identified news edition based on user profile data and real-time news updates and/or integrating the new objects into the last updated news edition while steaming the news edition video (390).

Figure 3:
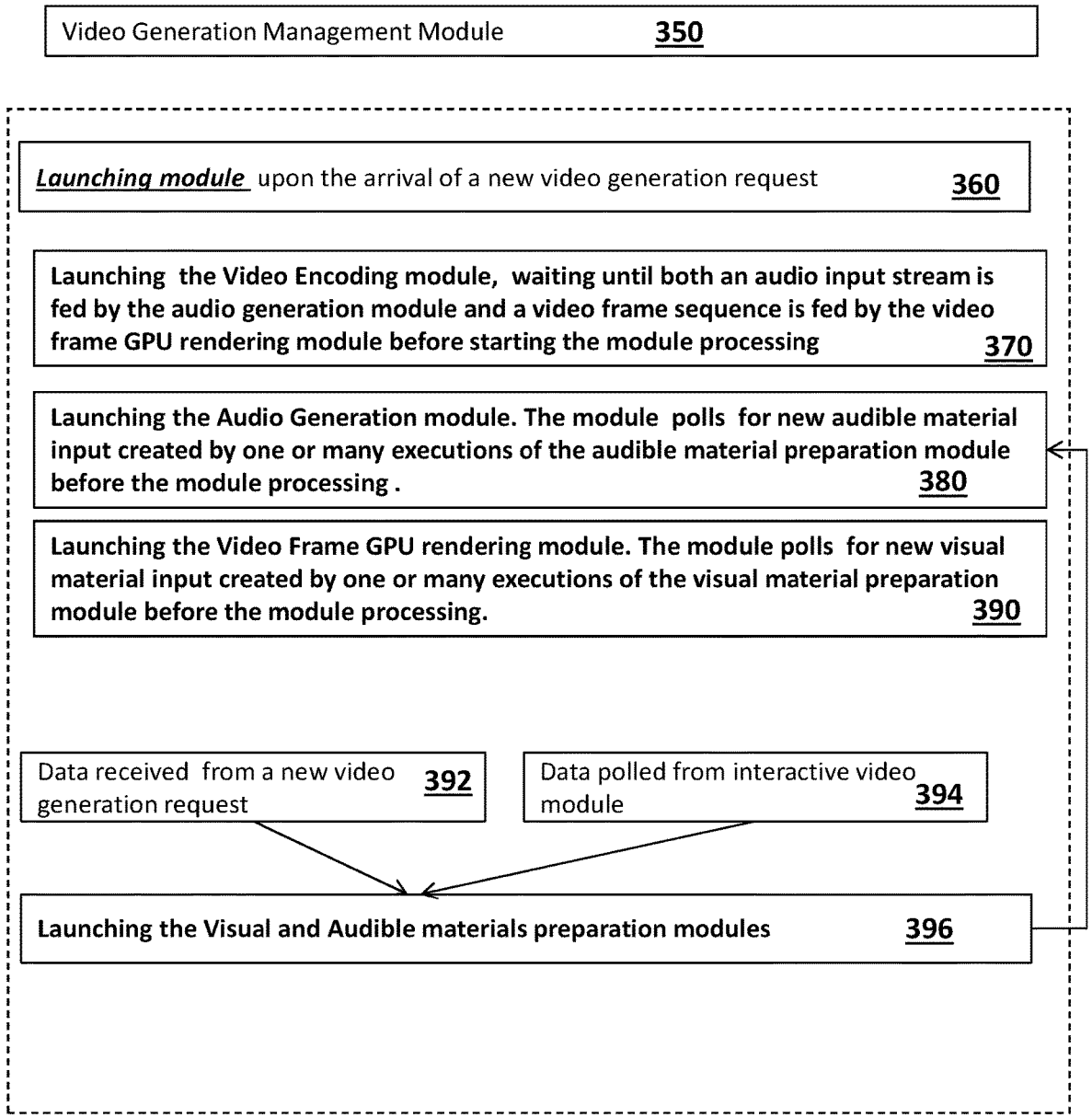
FIG. 3 is a flowchart diagram of a video generation management module, according to some embodiments of the invention.

FIG. 3 is a flowchart diagram of a Video Generation Management module 350, according to some embodiments of the invention. The video Generation Management module 350 is launched upon the arrival of a new video generation request (360). The module 350 coordinates the launching and/or operating of the video encoding module, the Audio Generation module and the Video Frame GPU rendering module. The encoding module is kicked off once both an audio input stream is fed by the audio generation module and a video frame sequence is fed by the video frame GPU rendering module (370). The Audio Generation module is launched when polling new audible material input created by one or many executions of the audible material preparation module (380). The Video Frame GPU rendering module is launched once polling new visual material input created by one or many executions of the visual material preparation module (390). The Video Generation Management module receives input data from a new video generation request (392) or Data polled from interactive video module (394). The preparation modules are launched based on a received new video request or new event data (396). At first, the preparation modules are launched when a new request is received, starting to generate all material items according to sequence order as defined by video template logic. Each time new event data arrives, the preparation modules are activated to update, choose or generate materials items.

Figure 4A:
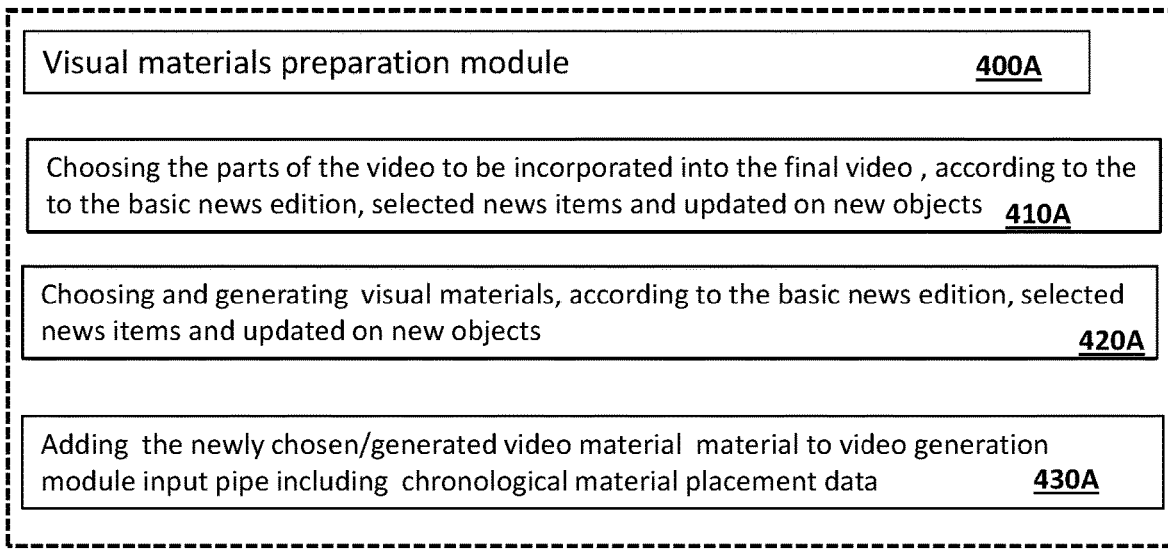
FIG. 4A is a flowchart diagram of a visual materials preparation module, according to some embodiments of the invention.
Figure 4B:
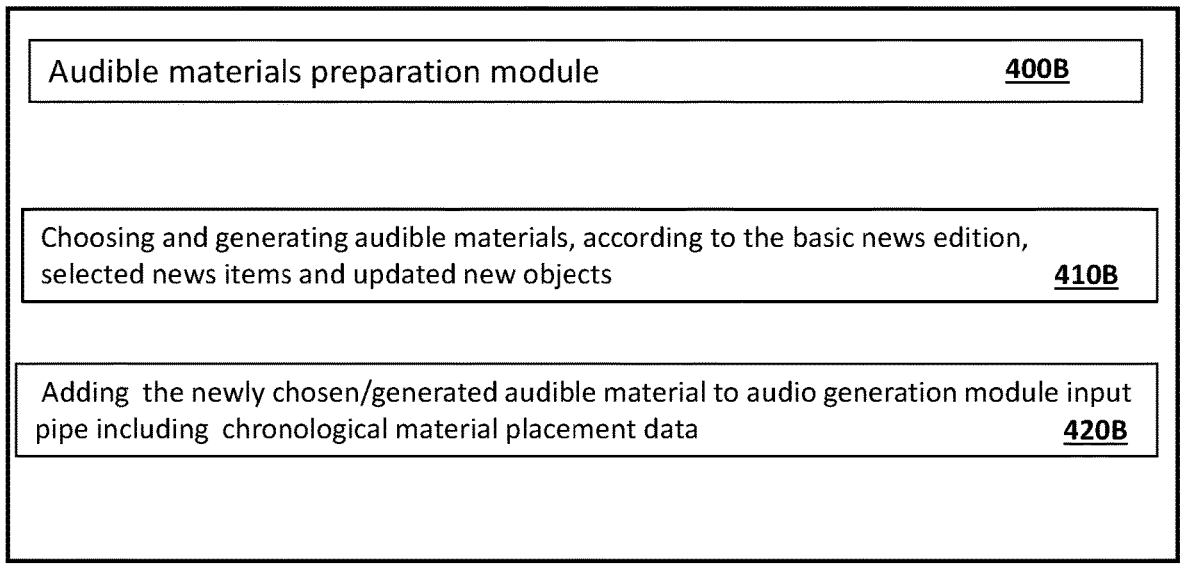
FIG. 4B is a flowchart diagram of an audio materials preparation module, according to some embodiments of the invention.

FIG. 4 is a flowchart diagram of a Visual materials preparation module 400, according to some embodiments of the invention. Once launched by Video Generation Management module, the module 400 selects the parts of the news item to be incorporated into the final video, according to the basic or last updated news edition, selected news items and updated on new objects (410). The module further configured to choose and generate visual materials, according to the basic news edition, selected news items and updates on new objects (420). The newly chosen or generated video material is added to video generation module input pipe including chronological material placement data (430).

FIG. 4A is a flowchart diagram of Audible materials preparation module 400A, according to some embodiments of the invention. Once launched by the Video Generation Management module, the module 400A selects and generates audible materials, according to according to the basic news edition, selected news items and updated on new objects (410A). The newly chosen/generated audible material is added to the audio generation module input pipe including chronological material placement data (420A).

FIG. 5 is a flowchart diagram of an Audio Generation Module 500, according to some embodiments of the invention. This module 500 is launched by Video Generation Management module (510). The module 500 repeatedly polls for input data created by a single or multiple executions of the audible material preparation module. Input data is processed according to its chronological and programmed order (520). At the next step the audio streams are refined, concatenated in proper gaps and ordering according to rules defined during the Audible materials preparation module (530). At the last step, the Audio streams are then processed and mixed together to create a single, unified audio stream to be used as the video's audio stream (540) and the audio stream is piped to the video encoding module (550).

FIG. 6 is a flowchart diagram of a Video Rendering module 600, according to some embodiments of the invention. The module 600 which is launched by Video Generation Management module (610), repeatedly polls for input data created by a single or multiple executions of the video material preparation module. Input data is processed according to its chronological and programmed order (620). At the next step, the module incorporates visual materials into a set of video templates as determined during the Visual and Audible materials preparation module (630). The module's products are rendered into video frames. Each rendered Video frame is piped to the video encoding modules according to its chronological order in the video (640).

Figure 7:
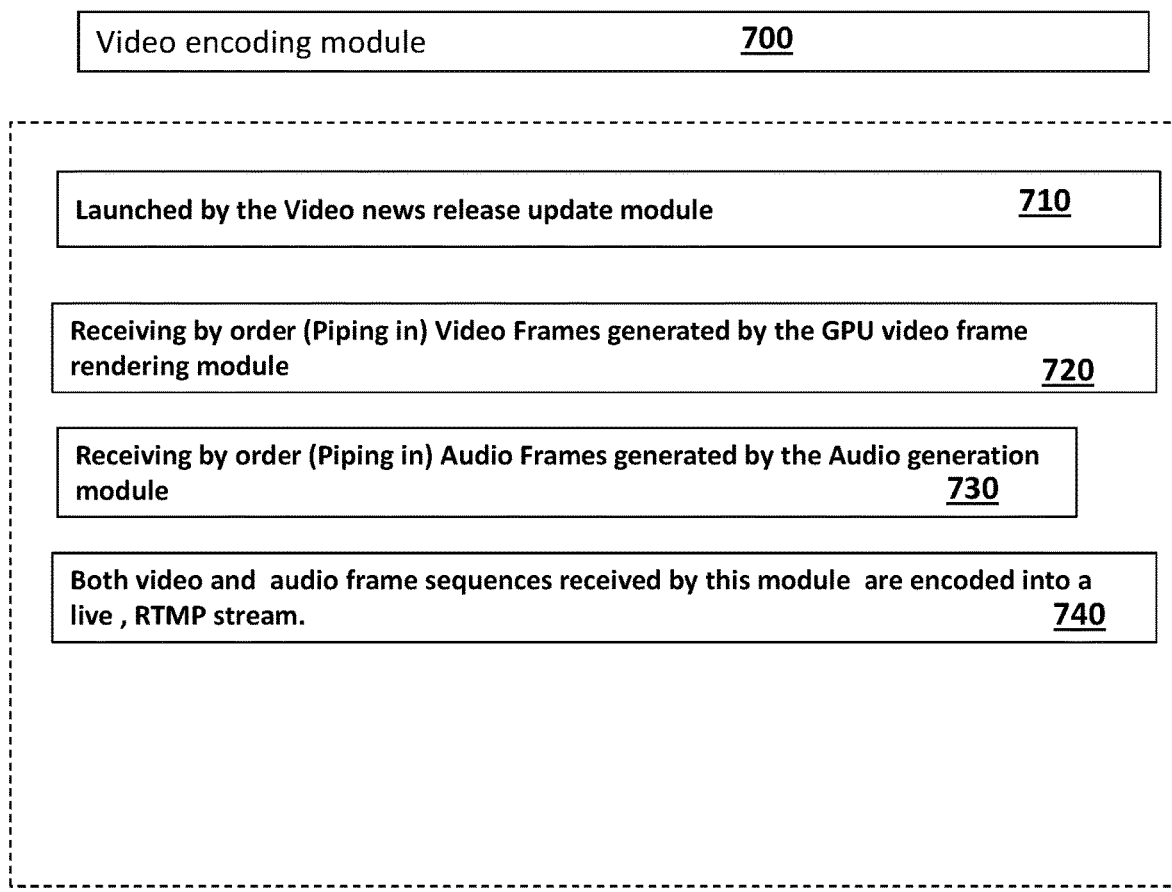
FIG. 7 is a flowchart diagram of a video encoding module, according to some embodiments of the invention.

FIG. 7 is a flowchart diagram of a Video encoding module 700, according to some embodiments of the invention. The module 700, which is launched by the Video generation management module (710), receives video Frames which were generated by the GPU video frame rendering module (720) and audio frames which were generated by the Audio generation module (730). Both video and audio frames sequences received by this module are encoded into a live RTMP stream (740).

Figure 8:
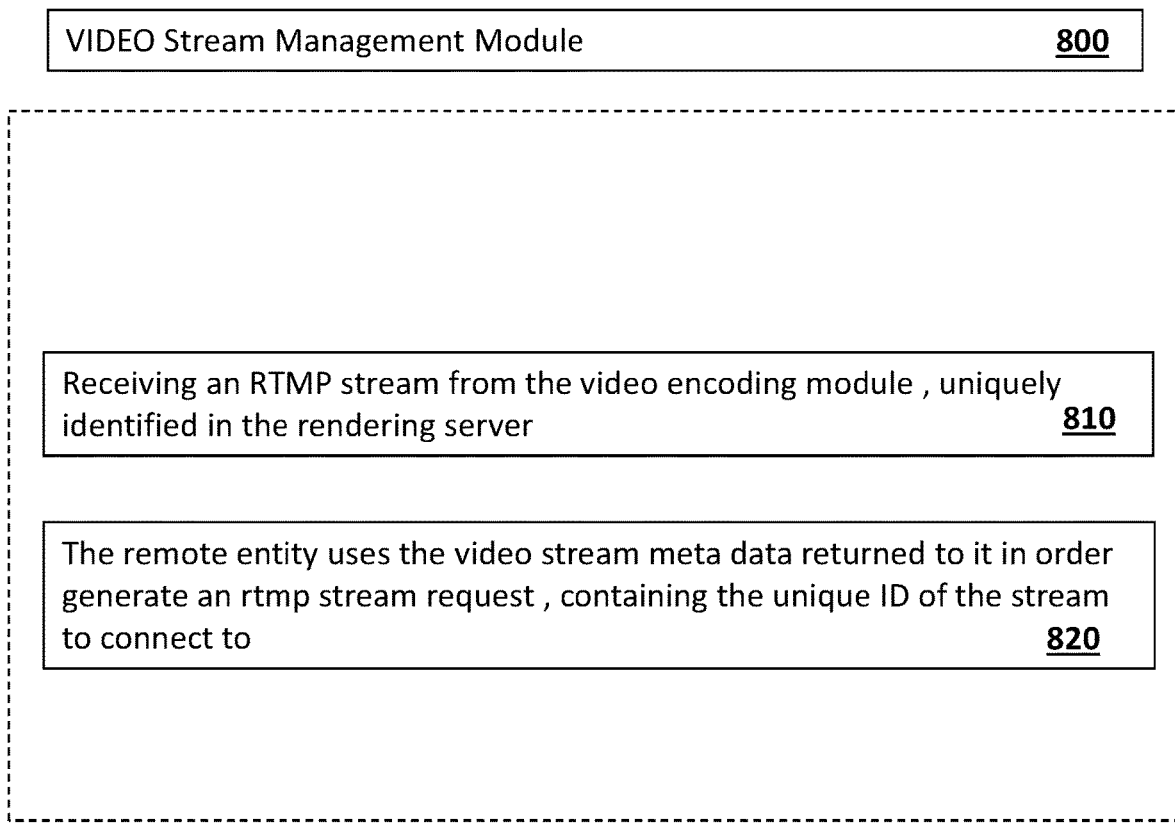
FIG. 8 is a flowchart diagram of an interactive video stream management module, according to some embodiments of the invention.

FIG. 8 is a flowchart diagram of an Interactive VIDEO Stream Management module 800, according to some embodiments of the invention. This module 800 receives an RTMP stream from the video encoding module, uniquely identified in the rendering server (810), enabling the remote entity (10) to use the video stream meta data which is returned to it in order, generating an RTMP stream request, containing the unique ID of the stream to connect to (820).

Figure 9:
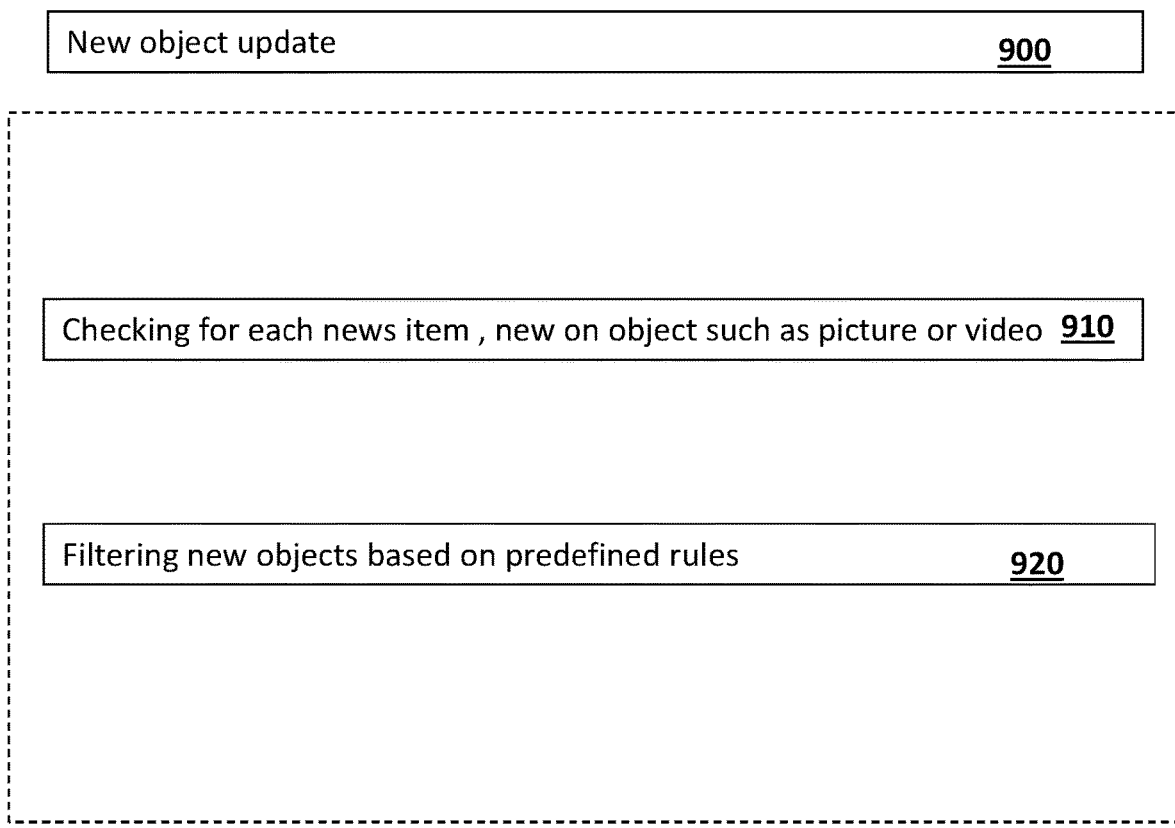
FIG. 9 is a flowchart diagram of a news object updating process, according to some embodiments of the invention.

FIG. 9 is a flowchart diagram of a News object update module 900, according to some embodiments of the invention. This module implements at least one of the following steps: checking for each news item, a new on object such as picture or video (step 910) and/or filtering new objects based on predefined rules (step 920).

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for generating and updating video news editions, implemented by one or more processors operatively coupled to a non-transitory computer readable storage device, on which is stored instruction code that when executed causes the one or more processors to perform, said method comprising the steps, implemented by the one or more processors, of:
   a news edition creator of the one or more processors generating a basic video news edition which comprises video news items organized according to a customizable priority and creating a priority queue of the video news items, wherein each of said video news items comprises objects including videos, images and text based on latest news information available updated for a specific date and time, wherein at least one object is defined as a dynamic news object including at least one image;
   a video news updater of the one or more processors receiving a user request for on demand updated video news edition which is to be updated for a specific date and time wherein the news edition incorporates a new news object updated for said specific date and time as requested by the user;
   a news object updater of the one or more processors polling new news objects from at least one news provider including at least one image related to at least one video news item of the basic video news edition, based on user profile data and real-time news updates;
   the video news updater identifying dynamic news objects to be replaced by the new news objects in each video news item of the basic video news edition, including at least one image;
   a visual materials preparer of the one or more processors choosing or generating visual materials, according to the basic video news edition, the video news items, and the new news objects;
   an audible materials preparer of the one or more processors choosing or generating audible materials, according to chosen or generated visual materials and the basic video news edition, the video news items, and the new news objects;
   the video news updater automatically generating the updated video news edition comprising an updated series of new video news items organized by priority, wherein the updated series of new video news items incorporates the new news objects updated to the user-requested specific time and date, and wherein each new video news item is generated automatically with at least one of the new news objects by rendering video frames using a graphic processor, the generated or chosen visual materials and the generated or chosen audible materials being automatically integrated into at least one of the rendered video frames, so that the rendered video frame automatically integrates at least some of the objects of the video news item with at least one new news object; and
   the video news updater streaming the updated video news edition to the user.

2. The method of claim 1 further comprising the steps of:
continuously receiving the new news objects related to the updated video news edition based on the user profile data and the real-time news updates; and
integrating the new news objects into a last updated news edition while streaming a continuously updated video news edition.

3. The method of claim 1, further comprising the step of deleting old items previously watched by the user in a previous video news edition version.

4. The method of claim 1, further comprising the step of filtering the video news items based on user preferences or restrictions.

5. The method of claim 1, further comprising the step of selecting the news items based on the user profile data.

6. The method of claim 1 further comprising the steps of:
adding the newly chosen or generated audible material to an input pipe including chronological material placement data;
refining audio streams, concatenated in proper gaps and ordering according to input pipe data which is defined during audible materials preparation including chronological material placement data.

7. A system for generating and updating video news editions, said systems comprising:
   a news edition creator implemented on at least one processor, configured for generating a basic news edition which comprises video news items organized according to customized priority, creating a priority queue, wherein each news items comprises objects including videos, images and text based on latest news information available updated for a specific date and time, wherein at least one object is defined as dynamic news objects, including at least one image;
   a video news updater implemented on at least one processor, configured to receive a user request for on demand updated video news edition for a specific date and time wherein the news edition incorporates a new news object updated for said specific date and time as requested by the user;

a news object updater implemented on the at least one processor, configured to poll new news objects from at least one news provider including at least one image related to the basic news edition based on user profile data and real-time news updates, a visual materials preparer of the one or more processors, configured to choose or generate visual materials, according to the basic video news edition, the video news items, and the new news objects;

an audible materials preparer of the one or more processors, configured to choose or generate audible materials, according to chosen or generated visual materials and the basic video news edition, the video news items, and the new news objects;

wherein the video news updater is further configured to identify dynamic news objects to be replaced by the new news objects in each video news item of the basic video news edition, including at least one image, and to automatically generate the updated video news edition including a series of new items organized by priority, wherein the series of new video news item incorporates the polled new news objects updated to the user-requested specific time and date, and wherein each new video news item is generated automatically with at least one of the new news objects by rendering video frames using a graphic processor based on latest new information available, the generated or chosen visual materials and the generated or chosen audible materials being automatically integrated into at least one of the rendered video frames, so that the rendered video frame automatically integrates at least some of the objects of the video news item with at least one new news object, and to start streaming the updated news edition video to the user.

8. The system of claim 7, wherein said video news updater is further configured to:
   continuously receive updated new news objects related to the requested video news edition based on the user profile data and the real-time news updates, and
   integrate the updated new news objects into the last updated news edition while streaming the updated news edition video.

9. The system of claim 7, wherein the video news updater is further configured to delete old items previously watched by the user in the video news edition.

10. The system of claim 7, wherein said video news updater is further configured to filter the video news items based on user preferences or restrictions.

11. The system of claim 7, wherein the video news updater is further configured to select the news items based on the user profile data.

* * * * *